Patented Jan. 11, 1927.

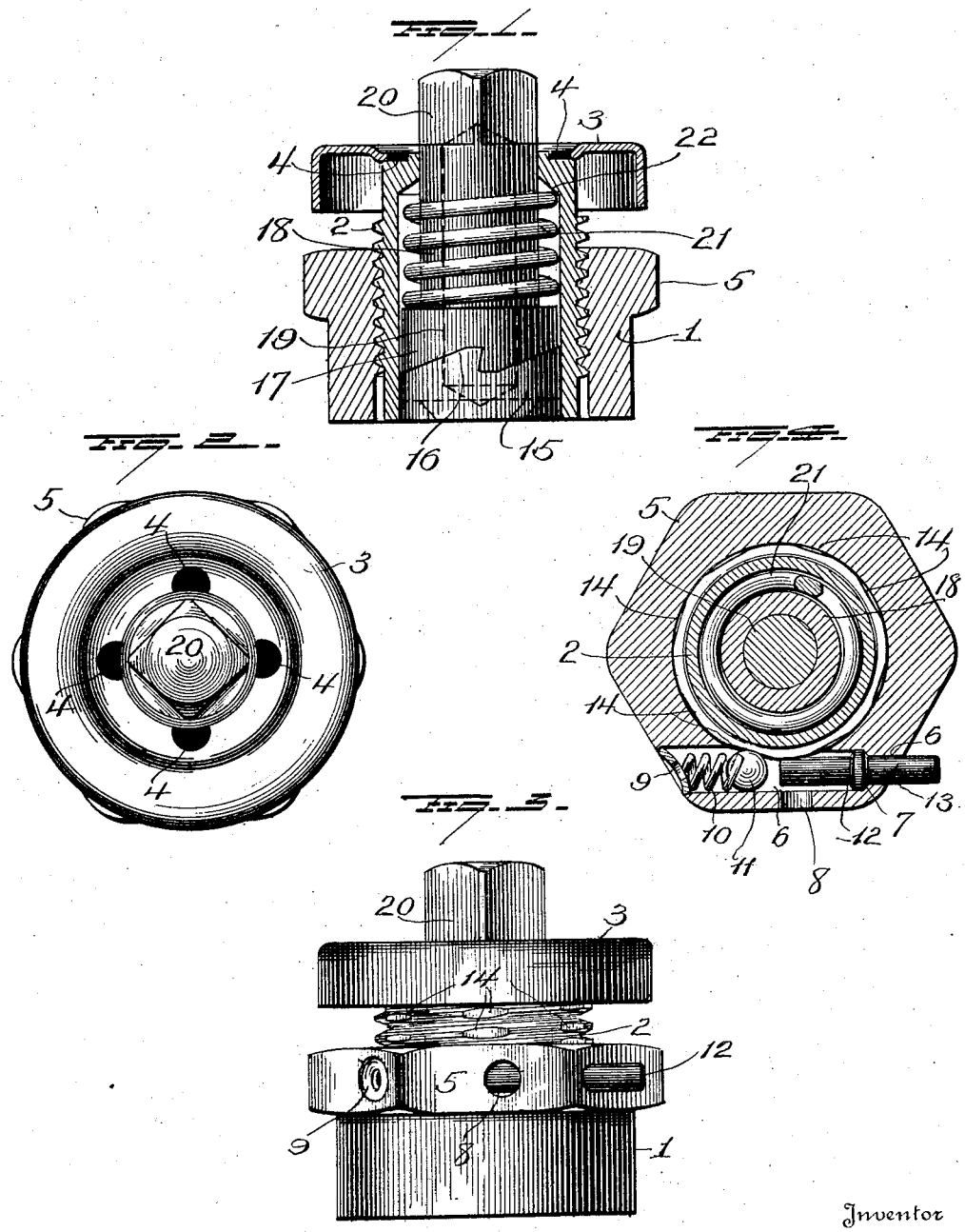

1,614,194

UNITED STATES PATENT OFFICE.

JOHN ROGERS FLANNERY, OF PITTSBURGH, PENNSYLVANIA, ASSIGNOR TO FLANNERY BOLT COMPANY, OF PITTSBURGH, PENNSYLVANIA.

LUBRICATING DEVICE.

Application filed June 7, 1922. Serial No. 566,621.

This invention relates to improvements in lubricating devices and more particularly to such as employ force feed means for hard lubricant or grease,—objects of the invention being to provide simple and efficient locking means to cooperate with the thread of the plug or plunger in a lubricator of the type specified, for effectually preventing the plug or plunger from becoming loose but which may be operated manually to unlock the plug and permit it to be turned backwardly, said locking means being such as not to interfere with the forward turning of the plug or plunger for controlling the feed of the lubricant; to conceal the locking member of the device in the wall of the cup; to guard against slipping of said locking member relatively to the plug or plunger, and to provide means whereby the operator will be prevented from applying such force with the use of a wrench in an attempt to unscrew the plug without first releasing the locking means, as might tend to crush the locking member or mutilate the thread on the plug.

With these and other objects in view, the invention consists in certain novel features of construction and combinations of parts as will hereinafter be described and pointed out in the claims.

In the accompanying drawings, Figure 1 is a vertical sectional view partly in elevation. Figure 2 is a plan view. Figure 3 is a view in elevation, and Figure 4 is a horizontal sectional view.

My improved lubricator is particularly useful for lubricating locomotive rod bearings, but it will be understood that it may be employed in many other connections where its application is permissible.

The lubricator comprises a cup member 1 to contain grease and is threaded internally, and an exteriorly threaded plug or plunger member 2 which may be operated to apply pressure to the grease and thus constitute force feed means. The cup member may be secured to the locomotive rod or other device by electric welding, or if desired, it may be made to have threaded connection with the locomotive rod in a hole which might be in the rod to which it may be desired to apply the device. The plunger member 2 is provided at its upper end with a hand wheel 3 which may be made of sheet metal if desired and secured to the upper end of the plunger by welding as indicated at 4.

The cup member 1 may be so formed exteriorly at its upper end as to provide an angular head portion 5. This head portion is made with a bore 6, a portion of which may be enlarged somewhat to form a shoulder 7 and said bore is so disposed as to intersect the threaded interior of the cup and with said bore, a hole 8 may be made to communicate. One end of the bore 6 is closed by means of a disk 9 and this disk forms an abutment for one end of a spring 10 located in the bore. Also located within the bore 6 is a locking member which, in the present instance is shown as a spherical body or ball 11. The spring 10 serves to force the ball 11 in such direction as to cause it to engage a thread or threads on the plunger 2 and become wedged between said thread or threads and the diametrically opposite portion of the bore 6 and thus to prevent the backward turning of said plunger but not preventing or interfering with the forward turning of the latter. The inner end portion of a pin 12 is located within the bore 6 and the outer end portion of this pin projects beyond the outer face of the head 5 on the cup,—an intermediate portion of said pin being provided with a shoulder or annular enlargement 13 to engage the shoulder 7 in the bore 6 and thus limit outward movement of said pin and prevent the passage of the locking member beyond the center of the plunger 2. It will be seen that when it is desired to unscrew or turn the plunger backwardly, this may be readily accomplished by pressing against the pin 12 and causing it to engage the ball 11 and press the latter backwardly against the resistance of the spring 10 thus releasing the ball from locked cooperation with the plunger. The plunger 2 can then be easily turned backwards by hand. It will be understood however that normally the plunger will be securely locked against backward movement and thus be prevented from becoming loose.

In order to guard against possibility of the ball 11 slipping relatively to the threads of the plunger, said threads may be made with slightly flattened portions as indicated at 14, thus giving to the plunger threads a somewhat fluted appearance.

It may be desired to provide means whereby a wrench may be employed to turn the plunger forwardly, but it is important that such wrench operating means shall be such as to prevent the operator from attempting to turn the plunger backwardly by means of a wrench without having first released the locking means, because it is evident that if too great force be applied with the use of a wrench to unscrew the plunger there will be a possibility of mutilating the thread of the plunger, and even crushing the ball 11. To guard against such forcible backward turning of the plunger with the use of a wrench but permitting a wrench to be employed for turning the plunger forwardly, the devices now to be described may be employed:

The plunger 2 is made hollow and provided in its lower end with a fixed plug 15 having cam faces 16 to form one member of a clutch,—the other member of said clutch consisting of a head 17 at the lower end of a shaft 18. The shaft 18 is mounted to turn on a spindle 19 made rigid with the plug 15 and said shaft projects through and beyond the upper end of the plunger and provided with an angular head 20 to receive a wrench. A spring 21 is located within the hollow plunger and surrounds the shaft 18,—one end of said spring bearing against a shoulder 22 in the upper portion of the plunger and the other end of said spring bearing against the head 19. With this construction and arrangement of parts it is evident that if the shaft be turned in clockwise-direction, the clutch member thereon will cooperate with the clutch member carried by the plug and the latter will be turned in a direction to feed the lubricant. Should an attempt be made to turn the shaft in the opposite direction, the cam faces of the respective clutch members will ride one upon the other and thus cause the shaft to so slip as to prevent undue force to be applied to the plunger in an attempt to unscrew the same.

Having fully described my invention what I claim as new and desire to secure by Letters-Patent, is:

1. The combination of a lubricant cup having a threaded interior and said cup also having a bore tangential to the bore of said cup and intersecting the threaded interior of the latter, a threaded plunger entering said cup, a movable locking obstacle in the tangential bore in the cup and adapted to be engaged by the thread of the plunger, and manually operable means for moving said obstacle out of engagement with the thread of the plunger.

2. The combination of a lubricant cup having a threaded interior and having a bore tangential to said threaded interior and intersecting the latter, a plunger having threads to mesh with the threads in the cup, a spring pressed obstacle in the tangential bore and adapted to cooperate with the threaded exterior of the plunger to lock the latter against backward movement, and a manually operable pin entering said tangential bore for moving said obstacle out of cooperative relation to the threaded exterior of the plunger.

3. The combination of a lubricant cup having a threaded interior and having a bore tangential to and intersecting the threaded interior of said cup, a plunger having a threaded exterior and entering said cup, circumferential edge portions of the thread on the plunger being flattened at intervals, and a movable obstacle in the tangential bore and adapted to cooperate with threads of the plunger to lock the latter against backward movement.

4. In a lubricator, the combination with a cup having a threaded interior and an exteriorly threaded plunger entering said cup and provided with manually operable means for turning said plunger, of locking means mounted in the wall of the cup and cooperable with the threaded exterior of the plunger to lock the latter against backward turning, means for releasing said locking means, and a wrench receiving member carried by said plunger and cooperable with the latter to turn the same in one direction and rotatable relatively to the plunger when turned in a backward direction.

5. In a lubricator, the combination with an interiorly threaded cup and an exteriorly threaded, manually operable plunger entering said cup, means mounted in the wall of the cup and cooperable with the threaded portion of the plunger for locking the latter against backward turning, means for releasing the locking means, a wrench receiving member carried by the plunger, and clutch means between said wrench receiving means and the plunger whereby the latter may be turned forwardly when said wrench receiving means is turned in one direction and whereby said wrench receiving means can turn independently of the plunger when rotated backwardly.

6. In a lubricator, the combination with an interiorly threaded cup, of an exteriorly threaded hollow plunger entering said cup, means whereby said plunger may be manually operated, means mounted in the wall of the cup and cooperable with the threaded portion of the plunger for locking the latter against backward turning, means for releasing the locking means, a plug closing the lower end of the plunger and constituting a clutch member, a spindle secured to said plug, a shaft mounted on said spindle and provided with a head at one end constituting a clutch member and provided at the other end with a wrench receiving head, and a spring within the hollow plunger, said spring encircling said shaft and bearing at one end against the plunger and at the other end against clutch head on said shaft.

7. The combination with a lubricant cup and a plunger movable therein, of means carried by and located in the wall of the cup for locking and for unlocking said plunger, a shaft carried by said plunger and adapted to receive a wrench, and means intermediate of said shaft and plunger whereby the plunger will be prevented from unlocking and turning backwardly if the shaft be turned backwardly with the use of a wrench.

In testimony whereof, I have signed this specification.

JOHN ROGERS FLANNERY.